US008789564B2

(12) United States Patent
Jividen et al.

(10) Patent No.: US 8,789,564 B2
(45) Date of Patent: Jul. 29, 2014

(54) ASPHALT LOADING ARM

(75) Inventors: Thomas Jividen, Findlay, OH (US); R. Benjamin Hill, Findlay, OH (US); Kenneth Stiens, Fairfield, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 743 days.

(21) Appl. No.: 12/931,026

(22) Filed: Jan. 21, 2011

(65) Prior Publication Data

US 2012/0186696 A1 Jul. 26, 2012

(51) Int. Cl.
*G01F 23/22* (2006.01)
*B67D 7/36* (2010.01)

(52) U.S. Cl.
CPC .................................... *B67D 7/362* (2013.01)
USPC ................. 141/198; 141/94; 141/95; 73/295; 374/143; 340/622

(58) Field of Classification Search
CPC ........................................................ G01K 5/28
USPC ........ 141/83, 94–96, 192, 198; 340/618, 620, 340/622; 374/143, 187, 188, 201, E5.017; 73/295
See application file for complete search history.

(56) References Cited

U.S. PATENT DOCUMENTS 3,955,416 A * 5/1976 Waiwood ........................ 73/295
4,112,765 A * 9/1978 Hollweck ........................ 60/530
4,541,735 A * 9/1985 Abu-Isa ......................... 374/188
4,564,834 A * 1/1986 Steele ........................... 340/622
4,789,946 A * 12/1988 Sinz ............................... 702/53
5,008,653 A * 4/1991 Kidd et al. .................... 340/620
5,816,708 A * 10/1998 Urich ............................ 374/203
5,966,311 A * 10/1999 Stemporzewski, Jr. et al. ............................ 700/281
6,615,658 B2 * 9/2003 Snelling .......................... 73/295
6,932,123 B1 8/2005 Craig et al.
6,935,387 B1 8/2005 Blubaugh
6,948,364 B2 * 9/2005 Snelling et al. ................. 73/295
6,973,828 B2 * 12/2005 Zimmermann et al. ........ 73/295
7,225,840 B1 6/2007 Craig et al.
7,568,835 B2 * 8/2009 Pils et al. ...................... 374/187
2010/0289654 A1 * 11/2010 Hunter et al. ................. 340/620

FOREIGN PATENT DOCUMENTS

DE 4124142 A1 * 1/1993

OTHER PUBLICATIONS

Dataforth Corporation, Application Note: 4-20 mA Transmitters, May 24, 2002, available at http://www.dataforth.com/catalog/bb/152_138011998.pdf.*
Acromag, Whitepaper: Introduction to the Two-Wire Transmitter and the 4-20MA Current Loop, Nov. 8, 2010, available at http://www.automation.com/pdf_articles/Acromag_Intro_TwoWire_Transmitters_4_20mA_Current_Loop_904A.pdf.*
RAPTOR Overfill Protection Probe, TPF, Inc., Jun. 3, 2013, available at http://tpftherm.com/pdf/2TPFB.pdf.*
U.S. Appl. No. 12/459,697, Jul. 6, 2009, Recker et al.

* cited by examiner

*Primary Examiner* — Timothy L Maust
*Assistant Examiner* — Robert Bell, III
(74) *Attorney, Agent, or Firm* — Emch, Schaffer, Schaub & Porcello Co., L.P.A.

(57) ABSTRACT

This asphalt loading arm is for dispensing fluids from a storage tank to a receiving tank. The loading arm includes an overfill probe to prevent overfilling during transfer from one tank in loading lanes at asphalt terminals. The overfill probe is a rapid temperature response probe. The rapid response temperature probe that has a very fast response time. Placing a transmitter on the probe uniquely allows a PLC to collect data from the probe.

9 Claims, 4 Drawing Sheets

ASPHALT LOADING ARM

TECHNICAL FIELD OF THE INVENTION

This invention relates to an asphalt loading arm for dispensing fluids from a storage tank to a receiving tank. More specifically, the loading arm includes an overfill probe to prevent overfilling during transfer from one tank to another tank in loading lanes at asphalt terminals.

BACKGROUND OF THE INVENTION

Tanks are used for storing or transporting flammable fluids such as gasoline, diesel fuel and other petroleum products. The fluids are transferred from the storage tanks to recipient tanks. Tanks can be mounted on tanker trucks or located underground at service stations. Tanker trucks are typically filled with the fluids using pumping equipment at the loading racks of marketing terminals, and underground storage tanks are typically gravity-filled from the trucks.

Asphalts also are transferred in a similar fashion. Asphalts are well known and widely used in a variety of products. Asphalts are primarily composed of high molecular weight hydrocarbons and invariably contain minor amounts of low molecular weight hydrocarbons. At asphalt terminals the tanker trucks top load when loading product. This situation creates an opportunity for the tanker to overfill and thus release product on the ground. Often a conventional overfill probe prevents overfill but also has many false trips throughout each load and have proven to be often unreliable.

A conventional prior art probe is shown in the drop tube assemblies disclosed in U.S. Pat. Nos. 6,935,387 and 7,225,840.

We also have discovered that a rapid temperature response probe would prevent an overfill and also would be a reliable solution.

We have discovered a temperature probe that has a very fast response time. We have found that placing a transmitter on the probe uniquely allows a PLC to collect data.

BRIEF SUMMARY OF THE INVENTION

Our novel invention is an apparatus for dispensing a liquid from a dispensing tank to a receiving tank comprising: a loading arm for dispensing liquid in to the receiving tank from the dispensing tank; wherein the loading arm has a lower end; a spout connected to the lower end of the loading arm; a fluid overfill detector probe connected to the spout; wherein the probe is a rapid analogue pressure temperature overfill response probe; a transmitter connected to the probe via probe electronics for receiving an electrical signal from the probe; and a programmable microprocessor connected to the transmitter configured to receive the electrical signal received from the probe.

The raptor probe works off of the following principle. When gas is heated, it expands. The probe uses the principle as follows. The probe is comprised of two basic components: a temperature probe and a 4-20 mA transmitter. As the gas inside of the temperature probe heats up, it will expand in a linear fashion for a specified range. The expansion of gas increases the pressure inside the cavity, which is then converted by the 4-20 mA transmitter.

A signal is sent to the PLC to be used by the PLC's logic. The asphalt during the loading process is around 320° F., when the overfill probe is in contact with the hot asphalt the PLC records a jump in temperature which alerts the system to an overfill and automatically shuts down the loading process.

The logic written in the PLC allows the probe to operate across a wide range of products and temperatures. The probe is capable of providing overfill protection to all asphalt products including polymer as well as emulsions and cutbacks. In addition to the asphalt the probe is able to be used with numerous other elevated temperature liquids.

The mechanics of the probe provides a reliable, fast acting, and weatherproof operation.

There are two items that are unique to this invention. First the probe is designed to have a very rapid response time. The second is programming the PLC to interpret the raw data to decide if a trip status has been met. When the probe comes into contact with the hot product the PLC records a large change in temperature. If the change in temperature meets a requirement in the programming, it will cause a trip status and shut down loading. If the probe temperature reaches a predetermined high temperature set point for the given product the logic will indicate a trip and will immediately shutdown loading.

Other objects and advantages of the present invention will become apparent to those skilled in the art upon a review of the following detailed description of the preferred embodiments and the accompanying drawings.

DETAILED DESCRIPTION OF THE INVENTION

The raptor probe works off of a the following principle. When gas heats up, it expands. The probe is comprised of two basic components: a temperature probe and a 4-20 mA transmitter. As the gas inside of the temperature probe heats up, it will expand in a linear fashion for specified range. The expansion of gas increases the pressure inside of the cavity, which is then converted by the 4-20 mA transmitter. A signal is sent to the PLC to be used in the PLC's logic.

Figure 1:
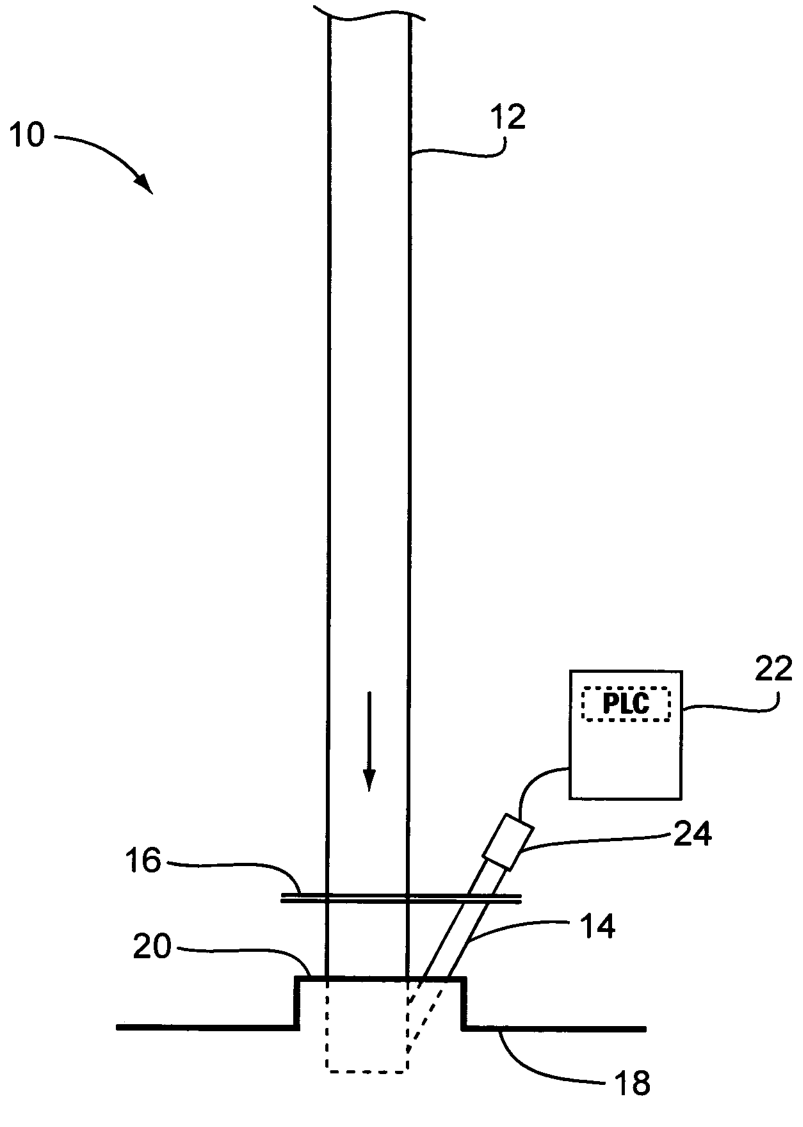
FIG. 1 is a side view of a loading arm and overfill probe assembly of this invention.

FIG. 1 is a side view of a loading arm and overfill probe assembly of this invention. The assembly is in place over the opening of a receiving tank. FIG. 1 shows assembly 10, which includes loading arm 12, overfill probe 14 and bracket 16 for supporting probe 14. Assembly 10 is positioned over receiving tank 18 and opening 20. Typically receiving tank 18 rests on a truck. PLC 22 is connected to transmitter 24 (see FIG. 2) of overfill probe 14.

Figure 2:
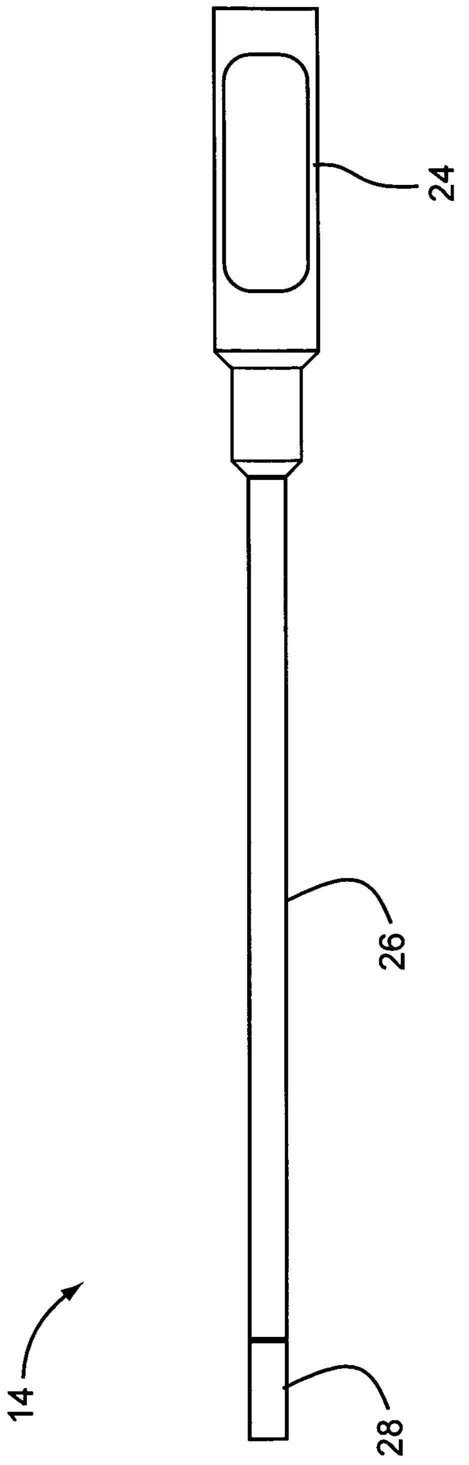
FIG. 2 is a side view of the overfill probe of this invention showing greater detail.

FIG. 2 is a side view of overfill probe 14. Probe 14 includes transmitter 24, housing 26, and sensor 28. Transmitter 24 is fully welded onto housing 26 to ensure the probe does not leak. Transmitter 24 requires a 24 VDC supply and outputs a 4-20 mA signal. Housing 26 is constructed with a stainless steel shell encapsulating a capillary tube. It also is welded to prevent leaks. Sensor 28 includes a stainless steel bulb and is welded into housing 26.

Figure 3:
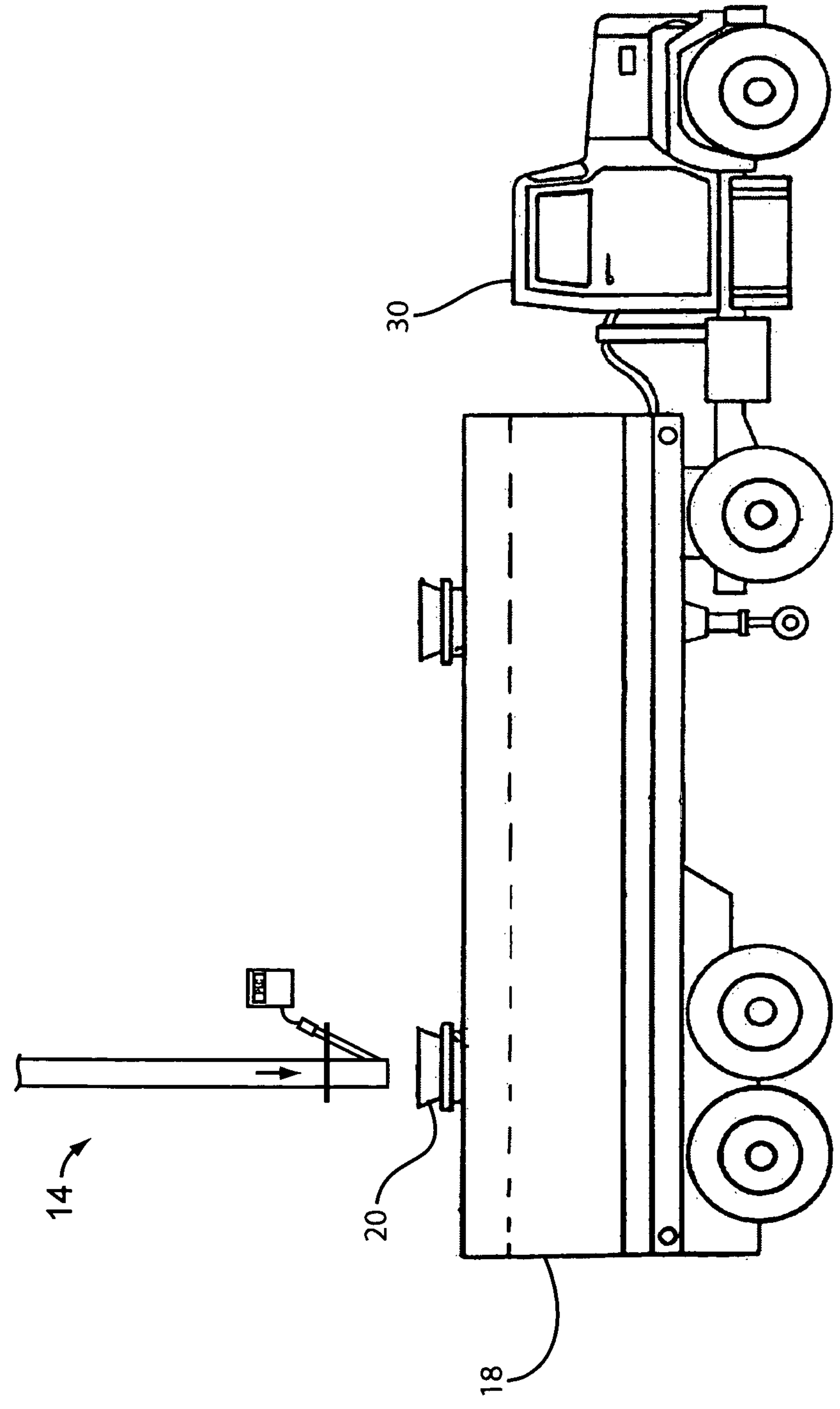
FIG. 3 is a side view showing the assembly of FIG. 1 in place over the dome opening on a receiving truck.

FIG. 3 is a side view showing the assembly of FIG. 1 in place over the dome opening on a receiving truck. Assembly 10 is positioned over receiving tank 18 and opening 20. Typically receiving tank 18 rests on truck 30.

EXAMPLE

Figure 4:
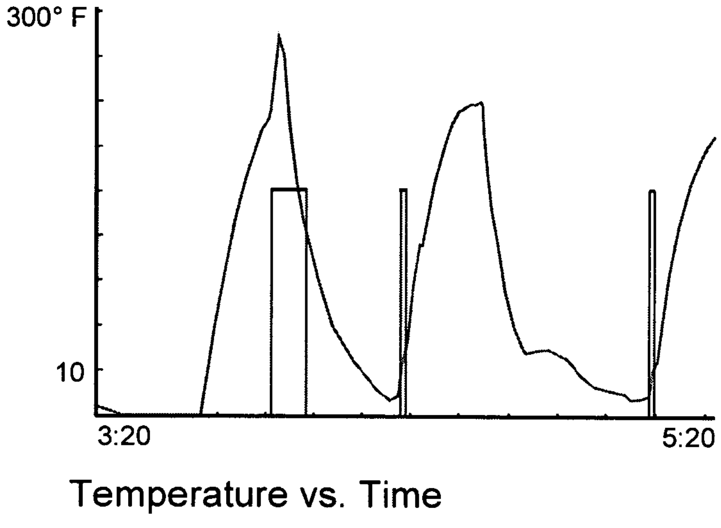
FIG. 4 shows a plot of temperature across time illustrating how the mechanics of the probe of this invention responds to temperature.

FIG. 4 shows a plot of temperature across time as the tan colored line during a typical load. The blue line is when the high level alarm has been tripped. Each peak represents a truck being loaded in real time. The temperature during a load slowly rises due to the hot vapors around the probe. This gradual rise in temperature will not trip high level alarm. The first peak shows a normal truck that is being loaded that has product hit the probe at the very end of the load. In this case the probe picked up the spike in temperature and the high level alarm tripped.

A true trip is characterized by a very fast rise in temperature usually at the end of a load. The second peak in FIG. 4 shows a false trip at the very beginning of a load. Here there is a spike in temperature due to the hot vapors heating up the probe rapidly which set off the high level alarm. We have addressed this issue by adjusting the trip slope in the PLC programming.

Figure 5:
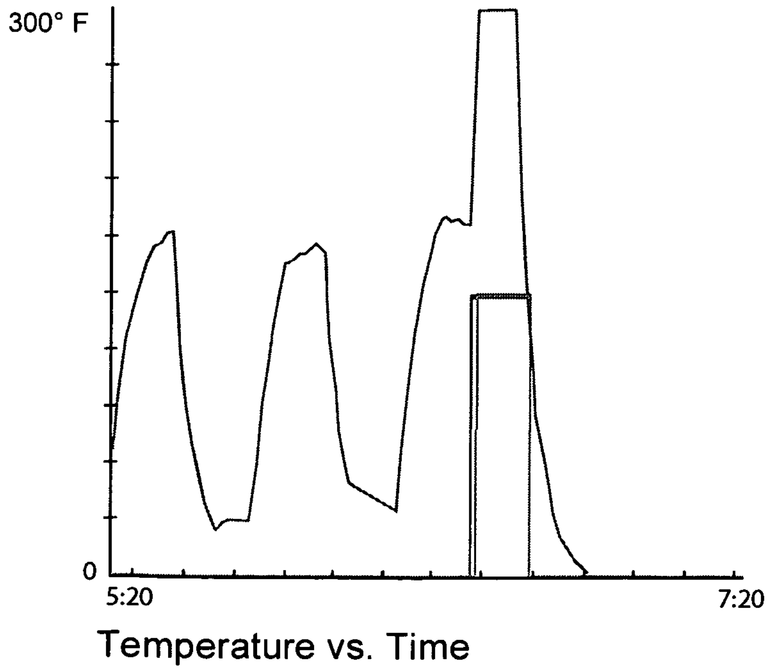
FIG. 5 shows a trip when the probe reaches a high level alarm temperature.

FIG. 5 shows a trip when the probe was in the product and the probe reached a high level alarm temperature. The teal trendline shows when the high level alarm that is tripped when the probe reaches a set temperature, in this case 300° F. FIG. 5 is typical of a high level trip that we have seen.

The raptor probe delivers these benefits:

Reduces the potential for overfilling a tanker truck by having a reliable device.

Reduces the cost of installation by only have 2 wires to wire into the PLC as well no additional power requirements.

Reduces down time on the rack by eliminating false trips.

Further, the raptor probe eliminates field diagnostics because of its simplistic design. The design allows the PLC programmer to trouble shoot at their desk. The probe is installed using the same mounting brackets that are currently installed on the load arms which will reduce the cost of installation. The probe is designed to handle years of use without breaking or leaking, if an issue does arise the PLC will automatically know and will shut down loading preventing an opportunity for an overfill. The logic associated with the raptor has several "fail safe" controls built in to ensure overfill protection.

In addition to these embodiments, persons skilled in the art can see that numerous modifications and changes may be made to the above invention without departing from the intended spirit and scope thereof.

We claim:

1. An apparatus for dispensing asphalt at a high temperature from a dispensing tank to a receiving tank comprising:
- a loading arm for dispensing liquid in to the receiving tank from the dispensing tank; wherein the loading arm has a lower end;
- a spout connected to the lower end of the loading arm;
- a fluid overfill detector probe connected to the spout; wherein the probe is a rapid analogue pressure temperature overfill response probe;
- a transmitter connected to the probe via probe electronics for receiving an electrical signal from the probe; and,
- a programmable microprocessor connected to the transmitter configured to receive the electrical signal received from the probe.

2. An apparatus according to claim 1 wherein the probe further comprises:
- a housing having a first end and a second end;
- a sensor connected to the first end of the housing; and
- the transmitter connected to the second end of the housing.

3. An apparatus according to claim 1 wherein the transmitter is a 4-20 mA transmitter.

4. An apparatus according to claim 1 further comprising a system for controlling the dispensing of the liquid wherein the system is connected to the programmable microprocessor.

5. An apparatus according to claim 4 wherein the programmable microprocessor is configured to alert the system to an overfill when the programmable microprocessor receives a signal recording a jump in temperature.

6. An apparatus according to claim 4 wherein the system is configured to shut down the dispensing when the programmable microprocessor receives a signal recording a jump in temperature.

7. An apparatus according to claim 1 wherein the liquid is hot asphalt.

8. An apparatus according to claim 1 wherein the programmable microprocessor further comprises logic configured to allow a predetermined a high level alarm temperature.

9. An apparatus according to claim 8 wherein the logic further is configured to shutdown loading when the temperature reaches the predetermined high level alarm temperature.

* * * * *